(12) United States Patent
Davidson

(10) Patent No.: US 11,779,002 B2
(45) Date of Patent: Oct. 10, 2023

(54) SCALLOP HARVESTING BAG

(71) Applicant: Daniel Lee Davidson, Clermont, FL (US)

(72) Inventor: Daniel Lee Davidson, Clermont, FL (US)

(73) Assignee: Pluck Em Dive Sports LLC, Clermont, FL (US)

( * ) Notice: Subject to any disclaimer, the term of this patent is extended or adjusted under 35 U.S.C. 154(b) by 216 days.

(21) Appl. No.: 16/949,021

(22) Filed: Oct. 9, 2020

(65) Prior Publication Data

US 2021/0105990 A1    Apr. 15, 2021

Related U.S. Application Data

(60) Provisional application No. 62/912,725, filed on Oct. 9, 2019.

(51) Int. Cl.
| | | |
|---|---|---|
| *A01K 97/20* | (2006.01) | |
| *A01K 80/00* | (2006.01) | |
| *B65D 33/28* | (2006.01) | |
| *B65D 33/02* | (2006.01) | |
| *B65D 33/14* | (2006.01) | |

(52) U.S. Cl.
CPC .............. *A01K 97/20* (2013.01); *A01K 80/00* (2013.01); *B65D 33/02* (2013.01); *B65D 33/14* (2013.01); *B65D 33/28* (2013.01)

(58) Field of Classification Search
CPC ........ A01K 97/20; A01K 80/00; B65D 29/04; B65D 29/00; B65D 33/28; B65D 33/02; B65D 33/007; B65D 33/14

USPC ....... 43/55; 383/117, 28, 61.4, 6, 13, 22–24, 383/48, 49

See application file for complete search history.

(56) References Cited

U.S. PATENT DOCUMENTS

| 268,558 | A | * | 12/1882 | Small | ..................... A01K 97/04 43/55 |
| 577,576 | A | * | 2/1897 | Garnhart | ................ A01K 97/04 D22/136 |
| 636,381 | A | * | 11/1899 | Hamel | ................... A01K 97/04 D3/904 |

(Continued)

FOREIGN PATENT DOCUMENTS

| GB | 2175183 | A | * | 11/1986 | ............. A01K 63/00 |
| GB | 2572131 | A | * | 9/2019 | ............. A01K 74/00 |

(Continued)

OTHER PUBLICATIONS

Translation of KR200467617Y1 (Year: 2013).*

*Primary Examiner* — Darren W Ark
(74) *Attorney, Agent, or Firm* — Squire Patent Consulting & IP Law LLC; Brendan E. Squire

(57) ABSTRACT

A scallop harvesting bag used for harvesting scallops. The scallop harvesting bag may clip to a swimsuit allows for the use of both hands to hold and put scallops into this bag. The scallop harvesting bag has a rigid to semi-rigid throated opening to facilitate insertion of harvested scallops into the bag. The bag is attached to a bottom end of the throated opening and has an extraction closure defined along at least one edge of the bag. The bag may be formed of a mesh material to facilitate cleaning sand and debris from the harvested scallops contained therein.

10 Claims, 4 Drawing Sheets

(56) References Cited

U.S. PATENT DOCUMENTS

| | | | | |
|---|---|---|---|---|
| 1,725,864 A * | 8/1929 | James | A01K 97/04 | 383/117 |
| 1,841,956 A * | 1/1932 | Juergens | A01K 97/20 | 383/117 |
| 2,241,314 A * | 5/1941 | Mohler | A01K 97/20 | 383/117 |
| 2,253,688 A * | 8/1941 | Collins | A01K 97/04 | 383/117 |
| 2,323,318 A * | 7/1943 | Farkas | A01K 97/20 | 383/117 |
| 2,603,028 A * | 7/1952 | Roberts | A01K 97/20 | 297/188.09 |
| 3,025,629 A * | 3/1962 | Sears | A01K 97/05 | 220/232 |
| 3,045,383 A * | 7/1962 | Pugliese | A01K 73/12 | 43/55 |
| 3,053,005 A * | 9/1962 | Byers | A01K 97/20 | 224/610 |
| 3,143,263 A * | 8/1964 | Farmer | A01K 97/04 | 224/920 |
| 3,381,408 A * | 5/1968 | Nishimura | A01K 97/20 | 43/55 |
| 3,478,463 A * | 11/1969 | Ruter | A01K 97/20 | 43/55 |
| 3,559,329 A * | 2/1971 | Chiu | A01K 97/20 | 493/103 |
| 3,674,188 A * | 7/1972 | Anderson | A01K 97/20 | 383/102 |
| 3,777,498 A * | 12/1973 | Andrews | B63C 11/52 | 383/102 |
| 3,811,411 A * | 5/1974 | Moeller | A01K 61/54 | 119/241 |
| 3,919,803 A * | 11/1975 | Manguso | A01K 97/20 | 43/55 |
| 3,920,179 A * | 11/1975 | Hall | A61J 19/00 | 4/144.2 |
| 3,988,853 A * | 11/1976 | Hudkins | A01K 97/20 | 43/55 |
| 4,112,602 A | 9/1978 | Kato et al. | | |
| 4,272,906 A * | 6/1981 | Liebling | A01K 77/00 | 43/134 |
| 4,399,629 A * | 8/1983 | Duncan | A01K 80/00 | 73/863.23 |
| 4,498,190 A * | 2/1985 | Garlick, III | B65D 85/50 | 383/102 |
| 4,570,374 A * | 2/1986 | Baxley | A01K 97/20 | 43/55 |
| 4,642,934 A * | 2/1987 | Carlson | A01K 63/02 | 220/495.08 |
| 4,775,082 A * | 10/1988 | Krache | A01K 97/04 | 224/920 |
| 4,845,886 A * | 7/1989 | Robinson | A01K 97/20 | 224/920 |
| 4,858,372 A * | 8/1989 | Ray | A01K 97/20 | 43/17.5 |
| 4,884,732 A * | 12/1989 | Sunderland | A01K 97/20 | 224/920 |
| 4,890,413 A * | 1/1990 | Nelson | A01K 97/20 | D22/136 |
| 4,905,404 A * | 3/1990 | Pasion | A01K 97/20 | 43/56 |
| 5,024,009 A * | 6/1991 | Kirkman | A01K 73/12 | 56/8 |
| D323,698 S * | 2/1992 | Nelson | D22/136 | |
| 5,212,902 A * | 5/1993 | Moorhead | A01K 63/02 | 43/56 |
| 5,400,745 A * | 3/1995 | Saxby | A01K 61/54 | 119/239 |
| 5,845,431 A * | 12/1998 | Waite | A01K 63/006 | 119/201 |
| 6,105,305 A * | 8/2000 | Edens | A01K 97/20 | 224/406 |
| 6,269,587 B1 * | 8/2001 | Wallace | A01K 97/20 | 206/315.11 |
| 6,652,339 B1 * | 11/2003 | Carmichael | B63C 11/26 | 441/6 |
| 6,662,488 B1 * | 12/2003 | Heimbrock | A01K 97/20 | 206/315.11 |
| 6,883,265 B1 * | 4/2005 | Jenssen | A01K 74/00 | 43/9.1 |
| 7,083,484 B2 * | 8/2006 | Carmichael | B63C 11/26 | 441/16 |
| 7,249,435 B1 * | 7/2007 | Tetenes | A01K 97/20 | 43/44.99 |
| 7,610,699 B2 | 11/2009 | Boudreau | | |
| 7,617,657 B2 * | 11/2009 | Liu | B65D 81/263 | 53/469 |
| 8,794,475 B1 * | 8/2014 | Daniels | A01K 77/00 | 220/560 |
| 9,271,558 B1 * | 3/2016 | Sandford | A45F 3/00 | |
| 9,516,866 B2 * | 12/2016 | ElHage | A01K 63/02 | |
| 2005/0268527 A1 * | 12/2005 | Beech | A01K 97/05 | 43/44.99 |
| 2011/0211775 A1 * | 9/2011 | Worthington | B65D 29/04 | 383/7 |
| 2012/0102811 A1 * | 5/2012 | Waugh | F41B 13/10 | 43/6 |
| 2013/0043251 A1 * | 2/2013 | Hendey, III | A01K 63/00 | 220/375 |
| 2014/0242232 A1 * | 8/2014 | McDonald | A23L 17/40 | 100/211 |
| 2015/0082686 A1 * | 3/2015 | Merritt | A01K 97/01 | 43/55 |
| 2020/0107531 A1 * | 4/2020 | Fountain | A01K 97/20 | |
| 2021/0321840 A1 * | 10/2021 | Storvik | A47L 9/00 | |

FOREIGN PATENT DOCUMENTS

| | | | |
|---|---|---|---|
| JP | 2011019492 A * | 2/2011 | |
| JP | 6164996 B2 * | 7/2017 | |
| JP | 2020039325 A * | 3/2020 | |
| JP | 2021029204 A * | 3/2021 | |
| KR | 20020062711 A * | 7/2002 | |
| KR | 200441122 Y1 * | 7/2008 | |
| KR | 20080002618 U * | 7/2008 | |
| KR | 20100005358 U * | 5/2010 | |
| KR | 20120022456 A * | 3/2012 | |
| KR | 20120002427 U * | 4/2012 | |
| KR | 20120005565 U * | 8/2012 | |
| KR | 20130035529 A * | 4/2013 | |
| KR | 20140001006 U * | 2/2014 | |
| KR | 20150046918 A * | 5/2015 | |
| WO | WO-2016186513 A1 * | 11/2016 | |

* cited by examiner

SCALLOP HARVESTING BAG

CROSS-REFERENCE TO RELATED APPLICATION

This application claims the benefit of priority of U.S. provisional application No. 62/912,725 filed Oct. 9, 2019, the contents of which are herein incorporated by reference.

BACKGROUND OF THE INVENTION

The present invention relates to scallop harvesting, and more particularly to bags for containing harvested scallops.

When an individual is harvesting scallops, it is desirable to carry the harvested scallops in a container. While scallop bags are intended for this purpose, it is often difficult to place multiple scallops in a bag at the same time.

Likewise, it is desirable that the bag have a closure to contain the harvested scallops within the bag. Since scallops are generally harvested in 4 to 8 feet of water, therefor the operation of the closure will be with the bag under water. However, it is difficult to open a draw string or a zippered bag closure under water to insert additional harvested scallops within the bag.

It is also desirable to be able to attach the bag to the users clothing so that they may comfortably wade the beach waters in search of scallops and have their hands available to harvest additional scallops.

As can be seen, there is a need for an improved scallop harvesting bag.

SUMMARY OF THE INVENTION

In one aspect of the present invention, a scallop harvesting bag is disclosed. The scallop harvesting bag includes a throated neck that has a generally cylindrical sidewall. A frusto-conical top end portion diverges outwardly to define a funnel shape opening. A bag having a neck at a top end of the bag defines an opening into an interior of the bag. The top end of the bag is secured to a bottom end of the throated neck.

In some embodiments, an annular lip is defined about an outer surface of the throated neck at a bottom end thereof. A drawstring is carried through the bag neck to cinch about the annular lip.

In some embodiments, a cord sleeve is positioned in abutment with the cylindrical sidewall proximal to the bottom end of the throated neck. A free end of the drawstring is carried through the cord sleeve.

In some embodiments, a scallop restraint is defined by one or more free ends of the drawstring extending between opposed interior sides of the generally cylindrical sidewall.

In some embodiments, an aperture is defined in a top end of the throated neck, the aperture dimensioned to retain an attachment device.

In other embodiments, a closure is defined along an edge of the bag. The closure is selectively operable to close the bag and access the interior of the bag. The closure may be a zipper.

In other aspects of the invention, a scallop harvesting bag includes a throated neck having a generally cylindrical sidewall and an annular lip defined around a bottom end of the throated neck. A bag is removably coupled to the throated neck defining an opening into an interior of the bag.

In some embodiments, a frusto-conical flange protrudes from a top end of the throated neck.

In some embodiments, a drawstring may be carried through a bag neck. The drawstring and bag neck configured to cinch the bag neck about the annular lip.

In some embodiments, the scallop restraint is operable between a restraining orientation wherein the one or more free ends of the drawstring extend across the interior of the throated neck and a passage orientation wherein the one or more free ends of the drawstring are angled towards a portion of the generally cylindrical sidewall.

In other embodiments, the attachment device may be a carabiner, a snap hook, or the like.

In yet other embodiments, a closure is defined along an edge of the bag, the closure selectively operable to close the bag and access the interior of the bag.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides a system, method, and apparatus for an individual to harvest scallops and have a container to retain the harvested scallops.

Figure 1:
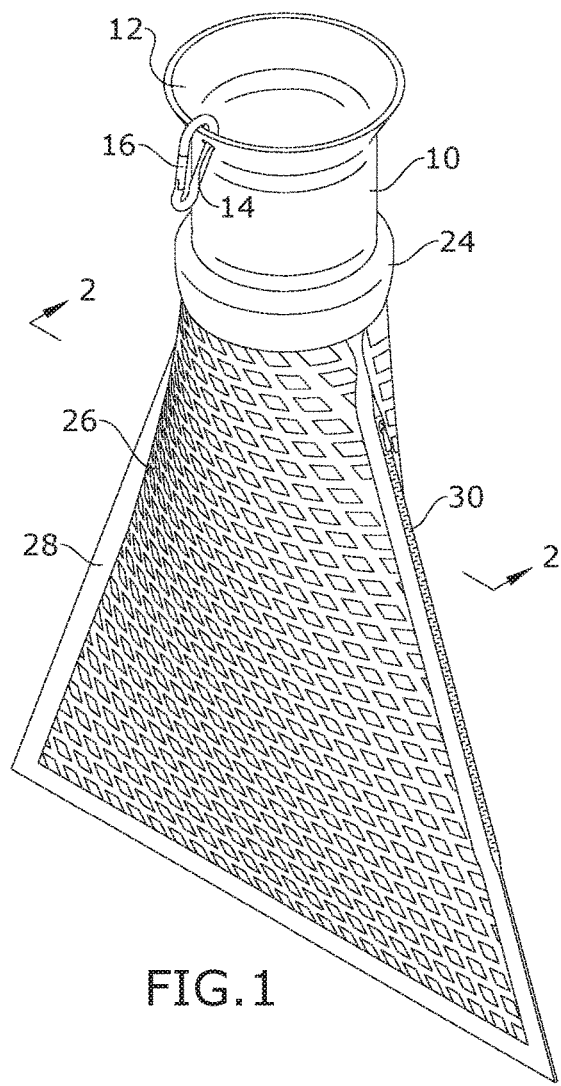
FIG. 1 is a perspective view of the scallop harvesting bag.
Figure 2:
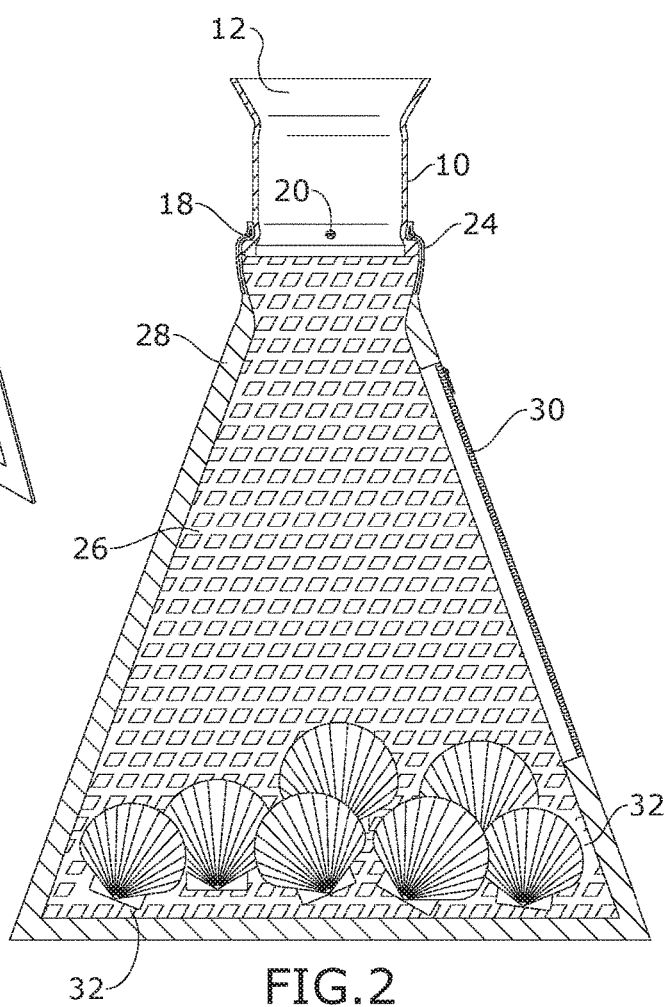
FIG. 2 is a section view of the scallop harvesting bag, taken along line 2-2 in FIG. 1.
Figure 3:
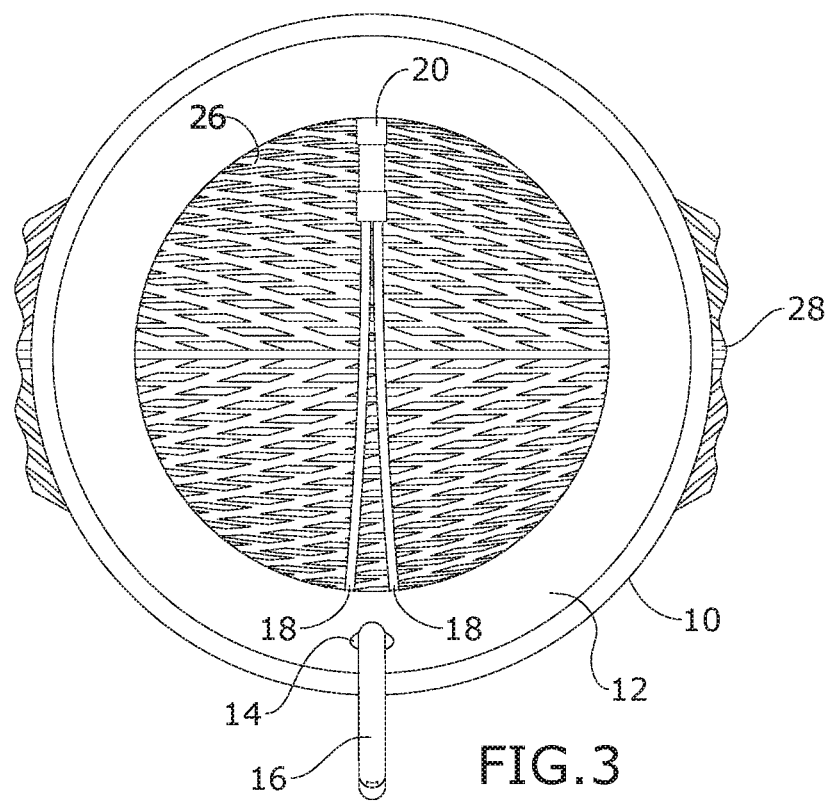
FIG. 3 is a top plan view of the throated neck.
Figure 4:
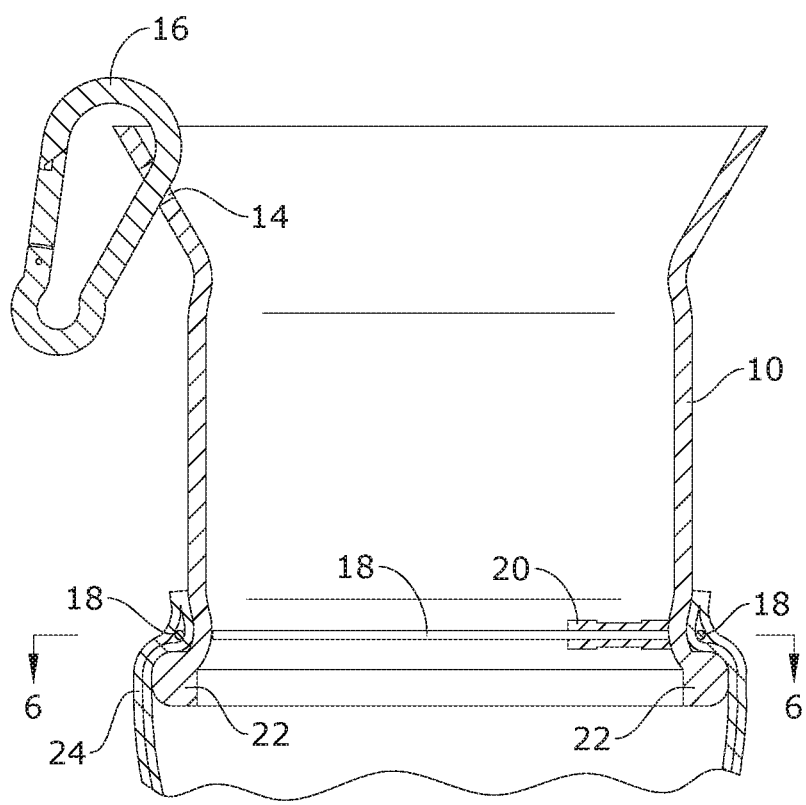
FIG. 4 is a detail section view of the throated neck showing attachment of the scallop bag.
Figure 5:
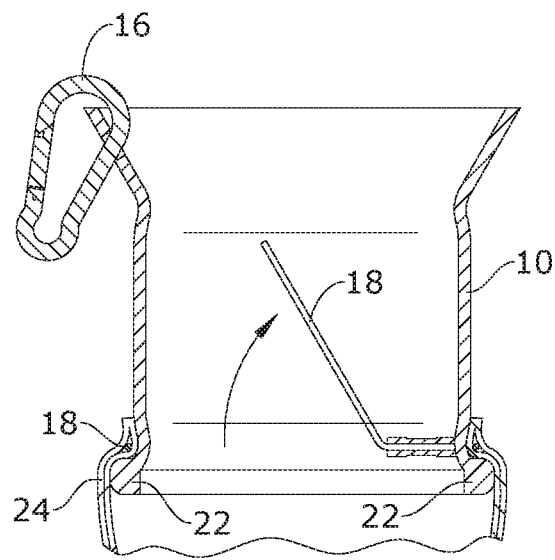
FIG. 5 is a detail section view of the throated neck showing attachment of the scallop bag, illustrating the ability to raise cord 18 to clear opening 12.
Figure 6:
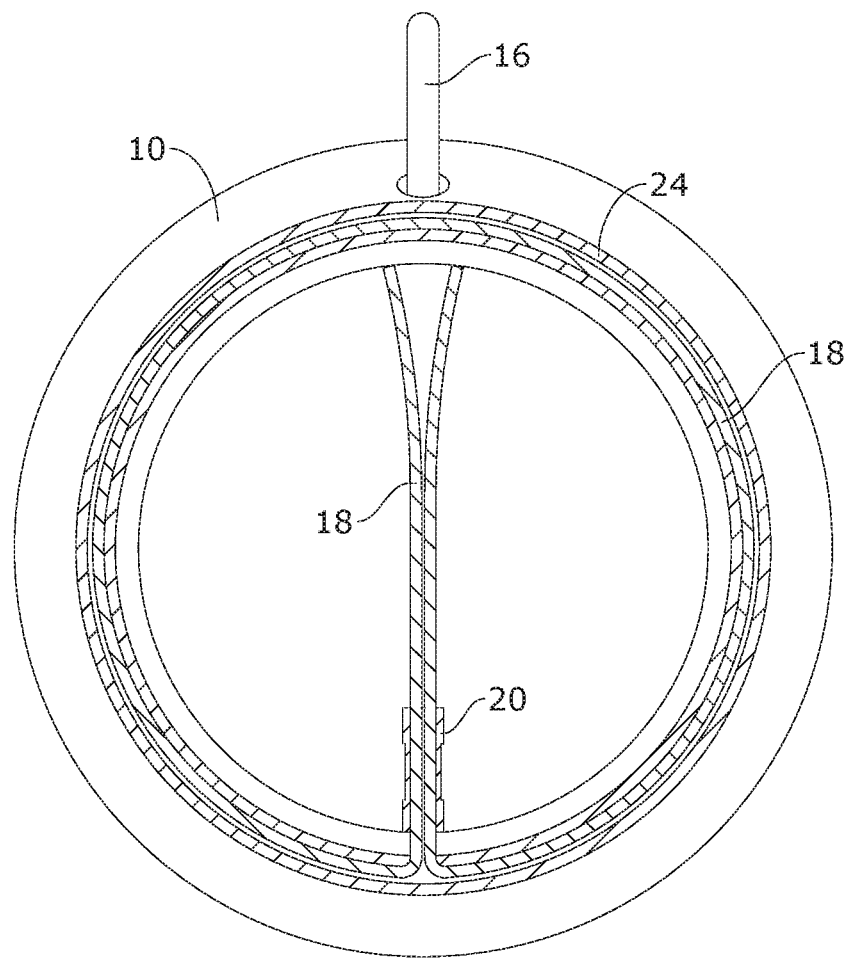
FIG. 6 is a section view of the throated neck, taken along line 6-6 in FIG. 4.
Figure 7:
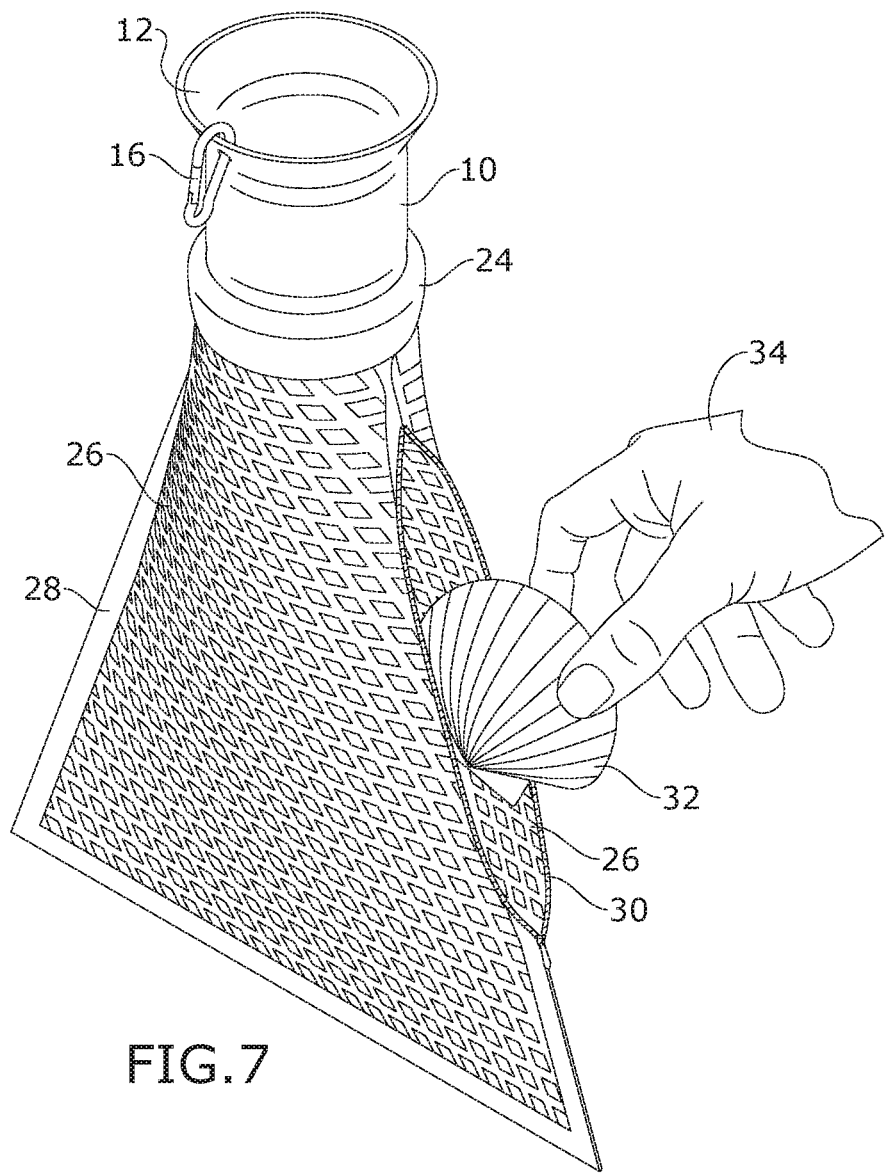
FIG. 7 is a perspective view of scallop harvesting bag, shown with zipper 30 open to remove scallop 32.
Figure 8:
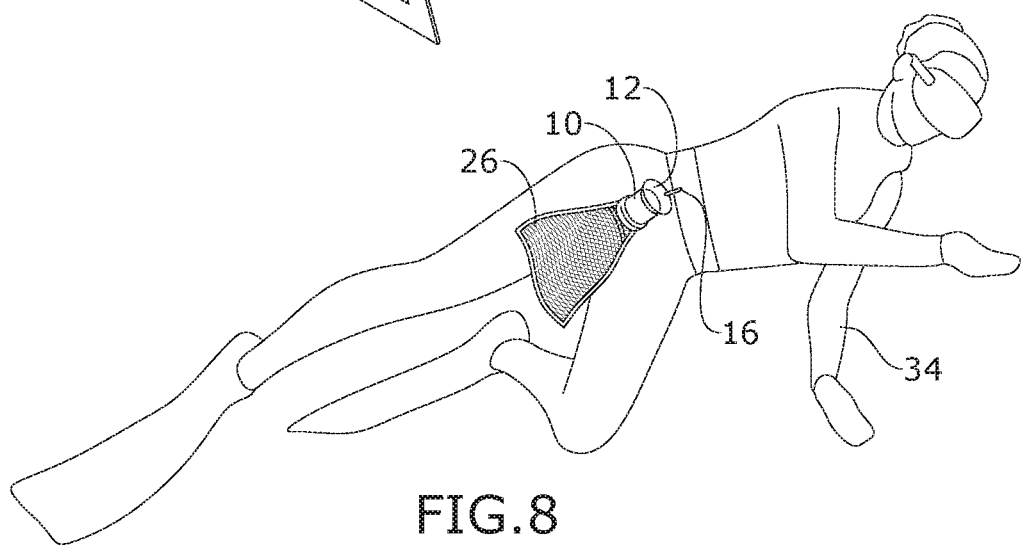
FIG. 8 is a perspective view of the scallop harvesting bag, shown in use.

As seen in references to the drawings of FIGS. 1-4, a scallop harvesting bag is illustrated. The scallop harvesting bag may be clipped to the user's swimsuit by a retainer clip, or carabiner, so that the user may enjoy hands free harvesting of the scallops.

Unlike other scallop harvesting bags, the present invention has a throated neck 10 providing an opening 12 to the scallop bag 26 that is formed as a rigid to semi rigid funnel shape to facilitate insertion of multiple harvested scallops into the bag. The throated neck 10 and opening 12 alleviates the problems associated with drawstrings utilized by existing scallop harvesting bags.

The throated neck 10 may be formed from a section of a PVC or other materials having a flared frusto-conical opening 12 at a top end of the throated neck 10. The bag 26 has a bag neck 24 that carries a drawstring 18 to retain the bag 26 about a lower end of the throated neck 10. Preferably, the lower end of the throated neck 10 has an annular lip 22 about which the bag neck 24 is positioned. The drawstring 18 to pulled to retain the bag neck 24 to the throated neck 10. The drawstring 18 may be formed of a mono filament leader carried by the bag neck 24 to secure the bag 26 about the annular lip 22.

The drawstring 18 may be carried through a cord sleeve 20 positioned in abutment with a lateral sidewall of the throated neck 10. The attachment device 16 may be secured in an aperture in the throated neck 10 when the scallop bag is not in use or carried by the user.

The bag 26 may be formed of a mesh material to permit debris that adheres to the harvested scallops 32 to fall through so that the scallops 32 may be self-cleaning as the harvester 34 continues to comb the beach for additional scallops 32. Additionally, the user 34 may immerse the scallop harvesting bag in the water along the beach to rinse the sand and debris from the harvested scallops 32 retained within the bag 26. The bag 26 may have a generally triangular shape, with the constricted opening at the top end and a wide base at the bottom end for retaining a plurality of harvested scallops 32.

The bag 26 may also include an extraction closure 30 along at least one edge of the bag 26 to extract harvested scallops 32 from the bag 26 to transfer the scallops 32 to a suitable container for storage, or to extract the scallops 32 for a final cleaning for meal preparation. In the embodiment shown, the extraction closure includes a zipper along a lateral side edge of the scallop harvesting bag.

The non-limiting embodiments of the present invention shown in the drawings may be formed with the following elements:
1. 4 inch PVC pipe cut to 3.5 to 4.5 inches.
2. A triangle shaped mesh bag roughly 14 inches tall and 14 inches long seemed together by binding tape.
3. A 9 inch zipper on the side edge of the bag.
4. A monofilament leader is utilized to attach the top end of the bag to PVC with extra leader and to act as a restraint system for the scallops.

In use, the harvester simply attaches the scallop harvesting bag to their bathing suit or beach apparel by the carabiner. Both hands are available to harvest scallops and fill the bag with scallops though the throated opening.

It should be understood, of course, that the foregoing relates to exemplary embodiments of the invention and that modifications may be made without departing from the spirit and scope of the invention as set forth in the following claims.

What is claimed is:

1. A scallop harvesting bag, comprising:
    a throated neck having a generally cylindrical sidewall and an annular lip defined around a bottom end of the throated neck; and
    a bag having a bag neck defining an opening into an interior of the bag, the bag neck being removably coupled to the bottom end of the throated neck via a mono filament leader material which is carried through the bag neck to cinch the bag neck about the annular lip; and
    a scallop restraint defined by at least one free end of the mono filament leader material extending between opposed interior sides of the generally cylindrical sidewall, the scallop restraint selectively movable between a restraining orientation wherein the at least one free end of the mono filament leader extends across the interior of the throated neck, and a passage orientation, wherein the at least one free end of the mono filament leader is angled towards a portion of the generally cylindrical sidewall.

2. The scallop harvesting bag of claim 1, further comprising:
    a frusto-conical flange protruding from a top end of the throated neck.

3. The scallop harvesting bag of claim 2, further comprising:
    a cord sleeve retaining the mono filament leader material, the cord sleeve positioned adjacent to a first opposed interior side of the opposed interior sides of the generally cylindrical sidewall proximal to the bottom end of the throated neck, wherein the at least one free end of the mono filament leader material is carried through the cord sleeve.

4. The scallop harvesting bag of claim 3, further comprising:
    an attachment device coupled to the throated neck through an aperture in the frusto-conical flange.

5. The scallop harvesting bag of claim 4, further comprising:
    a closure defined along an edge of the bag, the closure selectively operable to close the bag and access the interior of the bag.

6. A scallop harvesting bag, comprising:
    a throated neck having a generally cylindrical sidewall, a frusto-conical top end portion diverging outwardly to define a funnel shaped opening, and an annular lip defined about the bottom end of the throated neck;
    a bag having a bag neck at a top end of the bag defining an opening into an interior of the bag, wherein the bag neck is secured to a bottom end of the throated neck via a mono filament leader material which is carried through the bag neck to cinch the bag neck about the annular lip; and
    a scallop restraint defined by one or more free ends of the mono filament leader material extending between opposed interior sides of the generally cylindrical sidewall, the scallop restraint operable between a restraining orientation, wherein the one or more free ends extend across the interior of the throated neck, and a passage orientation.

7. The scallop harvesting bag of claim 6, further comprising:
    a cord sleeve positioned in abutment with a first opposed interior side of the opposed interior sides of the generally cylindrical sidewall proximal to the bottom end of the throated neck, wherein the one or more free ends of the mono filament leader material are carried through the cord sleeve.

8. The scallop harvesting bag of claim 7, further comprising:
    an attachment device coupled to the throated neck through an aperture in the frusto-conical top end portion.

9. The scallop harvesting bag of claim 6, further comprising:
    a closure defined along an edge of the bag, the closure selectively operable to close the bag and access the interior of the bag.

10. The scallop harvesting bag of claim 9, wherein the closure is a zipper.

* * * * *